United States Patent

[11] 3,609,431

| [72] | Inventor | Joshua Lifschitz |
| | | Stamford, Conn. |
| [21] | Appl. No. | 844,884 |
| [22] | Filed | July 25, 1969 |
| [45] | Patented | Sept. 28, 1971 |
| [73] | Assignee | Sperry Rand Corporation |
| | | New York, N.Y. |

[54] HOLLOW PRINTED CIRCUIT ARMATURE
4 Claims, 7 Drawing Figs.

[52] U.S. Cl. .................................................. 310/266,
174/117.11
[51] Int. Cl. .................................................. H02k 1/22
[50] Field of Search .......................................... 310/266,
171, 268, 154, 265, DIG. 6; 174/117.11

[56] References Cited
UNITED STATES PATENTS

| 2,703,854 | 3/1955 | Eisler | 174/117.11 UX |
| 3,209,187 | 9/1965 | Angele | 310/154 X |
| 3,312,846 | 4/1967 | Henry-Baudot | 310/266 |
| 3,356,877 | 12/1967 | Burr | 310/154 X |
| 3,441,761 | 4/1969 | Painton et al. | 310/154 |

*Primary Examiner*—D. F. Duggan
*Attorneys*—Charles R. Miranda and Burtsell J. Kearns ABSTRACT: A printed circuit armature wherein the conductors are printed on one face of an insulated support member, and which member is adapted to be folded into opposing leaf portions and then rolled into a cylinder whereby the conductors are arranged on the inner and outer surfaces of the cylinder.

PATENTED SEP 28 1971 3,609,431
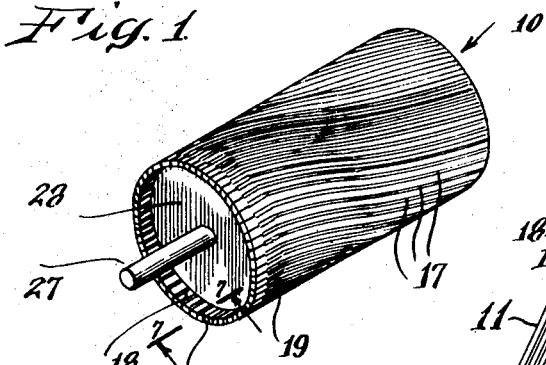
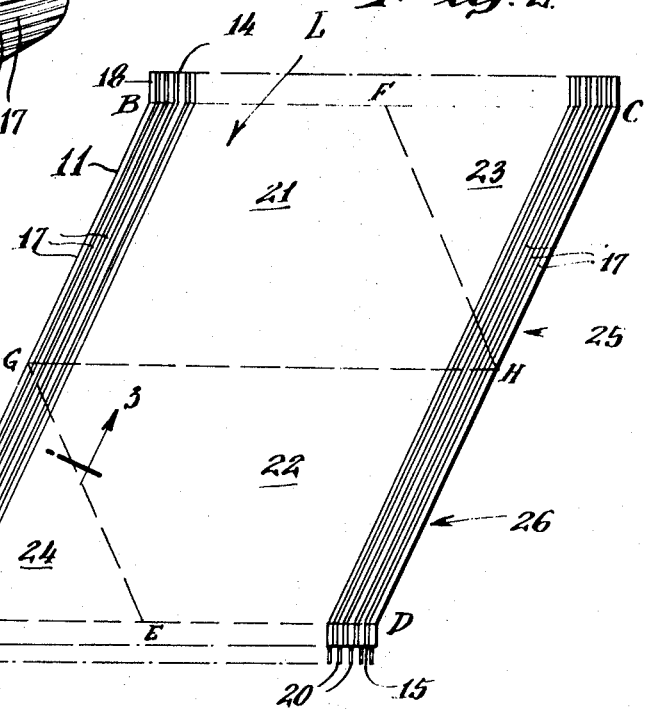
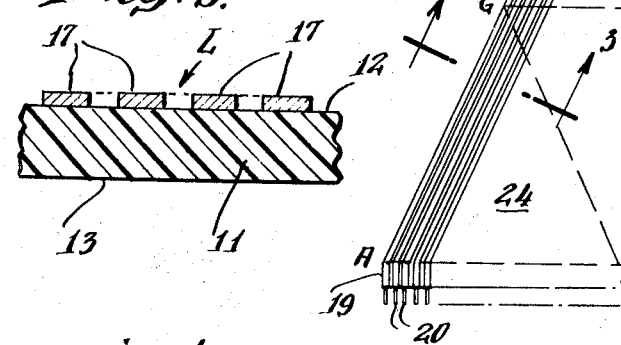
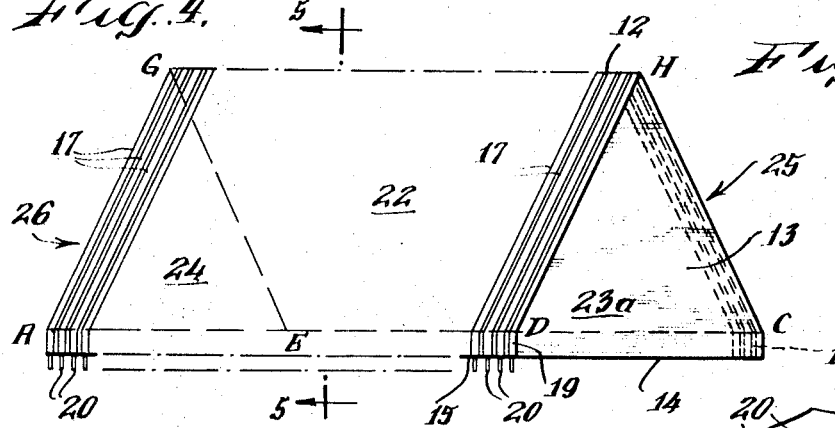
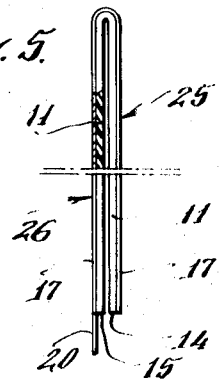
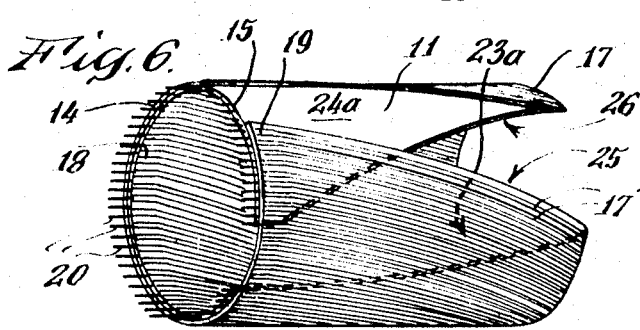
INVENTOR.
Joshua Lifschitz
BY
ATTORNEY.

HOLLOW PRINTED CIRCUIT ARMATURE

BACKGROUND OF INVENTION

The present invention is directed to new and useful improvements in armatures and in methods of making armatures, and particularly armatures of the type wherein the electric circuit is printed on an insulated support member.

In certain small DC motors, for example those used in portable household appliances, the motor armature is mounted for rotation within a stator member. One type of known armature used in these motors comprises a stack of iron laminations fixed to a central shaft member. The laminations are provided with arms extending away from the shaft, and about which arms are wound coils of wire to form a completed armature circuit.

In another type of armature, generally known as printed circuit armatures, the wire wound coils and stacked laminations are replaced by conductors that are etched or printed on an insulated support member that is adapted to be formed, for example into a cylindrical shape. In some printed circuit armatures a plurality of individual conductors are printed on opposite faces of a sheetlike support member. In other such armatures the circuit is formed by electroplating conductors on the inner and outer surfaces of a hollow cylinder. In these known printed circuit armatures the circuit is completed by connecting each end of a conductor on one face of the support member to a conductor on the opposite face. Since each conductor must be connected at at least two points with another conductor problems are presented in small or finely detailed printed circuit armatures in aligning the conductors on opposite faces of the support member so that the points of connection register.

It is an object of this invention to provide a novel armature.

Another object is to provide a novel armature having conductors printed on one face of a support member and which member is adapted to be folded and readily formed into a cylinder having conductors arranged on the inner and outer surfaces thereof.

Another object is to provide a novel printed circuit armature wherein conductors printed on opposite leaves of a folded insulated support member are readily aligned for interconnection to provide a completed armature circuit.

A further object is to provide a printed circuit armature wherein novel means are provided for connecting the ends of conductors formed on the inner surface of a cylinder with the ends of conductors on the outer surface thereof.

A still further object is to provide a novel printed circuit armature wherein the conductors on the inner surface of the armature cylinder are adapted to be interconnected at one end to the conductors on the outer surface of the cylinder.

Another object is to provide a novel method for making an armature.

BRIEF SUMMARY OF THE INVENTION

The present invention contemplates a novel armature. In one embodiment the armature comprises a plurality of conductors printed on one face of an insulated sheetlike support member. The conductors are arranged in spaced and parallel relationship and extend between opposite parallel edges of the support member. At one edge of the support member the conductors terminate in tabs which project beyond the one edge, and at the other edge the conductors terminate in connecting terminal portions. The sheetlike support member is adapted to be folded along an imaginary medial line into opposing leaf portions. The folded support member is then rolled into a hollow cylinder with the conductors presented on the inner and outer surfaces of the cylinder. Each tab of a conductor on one surface of the cylinder is adapted to register with a connecting terminal portion of a conductor on the other surface of the cylinder for connection therewith to provide a continuous coil about the inner and outer faces of the cylinder.

The above and other objects and advantages of the present invention will appear more fully hereinafter from a consideration of the detailed description which follows taken together with the accompanying drawing wherein one embodiment of the present invention is illustrated.

DESCRIPTION OF VIEWS OF DRAWING

FIG. 1 is a perspective view of a completed armature which incorporates the present invention;

FIG. 2 is a plan view of the armature prior to being folded and rolled into a cylinder;

FIG. 3 is an enlarged fragmentary sectional view of the armature taken on the line 3—3 of FIG. 2;

FIG. 4 is a view of the armature of FIG. 2 when folded into opposing leaf portions;

FIG. 5 is an enlarged fragmentary sectional view of the armature taken on the line 5—5 of FIG. 4;

FIG. 6 is a perspective view of the folded armature of FIG. 4 partially rolled into a cylinder; and FIG. 7 is an enlarged fragmentary sectional view of the armature taken along line 7—7 of FIG. 1.

DETAILED DESCRIPTION

Referring now to the drawing for a more detailed description of the present invention, an armature incorporating an embodiment thereof is generally indicated by the reference numeral 10 in FIG. 1.

Armature 10 comprises a flat sheetlike support member 11 in the shape of an oblique parallelogram (FIG. 2) having spaced upper and lower edges 14 and 15 and opposite faces 12 and 13 (FIG. 3). Support member 11 is made of a suitable flexible insulating material such as a polyimide and is provided with a plurality of spaced and parallel conductors 17 (FIG. 2) that extend between the upper and lower edges 14 and 15 of said member. Conductors 17 are provided with end terminals 18 and 19 (FIG. 2) and which terminals are substantially perpendicular to the edges 14 and 15 respectively of support member 11. Each conductor 17 is further provided with an unsupported end tab extension 20 (FIG. 2) that projects beyond edge 15 of support member 11.

Conductors 17 are formed in any suitable manner, such as by bonding a copper lamination L (partially shown and indicated by broken lines in FIG. 3) to the entire surface of face 12 of support member 11 and then etching the conductors therefrom in a known manner, as by coating the copper surface with a photoresist, making the coating with a circuit pattern, exposing this arrangement to ultraviolet light, rinsing the exposed copper and treating it with an etchant such as ferric chloride.

Prior to forming conductors 17 on support member 11 a strip of the insulating material is removed below edge 15 to expose a marginal portion of unsupported copper and from which portion tabs 20 are etched simultaneously with conductors 17. It is preferable that the strip of insulating material be removed below edge 15 prior to etching to avoid the risk of tearing or otherwise damaging the end tabs 20.

As will be seen in FIG. 2 the support member comprises two substantially congruent trapezoidal zones 21 and 22 bounded by imaginary lines indicated by the letters BFHG and EDHG respectively and two substantially congruent triangular zones 23 and 24 bounded by imaginary lines indicated by the letters FCH and AEG respectively in FIG. 2.

As mentioned it is a feature of the present invention to provide an armature member wherein the conductors on the inner and outer surfaces of an armature cylinder are readily aligned for interconnection to provide a continuous coil about the inner and outer surfaces of the cylinder. To this end sheetlike support member 11 is adapted to be folded along an imaginary medial line indicated by the letters GH in FIG. 2 into opposing leaf portions 25 and 26 (FIGS. 2, 4 and 5). When support member 11 is folded along medial line GH (FIG. 4) leaf 26 is pressed against leaf 25 and upper and lower edges 14 and 15 of support member 11 are brought into adjacent side-by-side relationship (FIG. 5).

Trapezoidal zone 22 on leaf 26 is congruent with trapezoidal zone 21 on leaf 25 and tabs 20 are positioned to extend beyond the said adjacent edges 14 and 15 (FIG. 5). The rear surface of triangular zone 23 from that shown in FIG. 2 is indicated by the reference numeral 23a in FIG. 4 and which triangular portion in folded position of support member 11 extends beyond the edge HD of leaf 26.

To complete the shape of the armature the folded support member 11 (FIG. 4) is formed into a cylinder. To accomplish this the folded support member 11 is first rolled in any suitable manner, such as around a mandrel, from the configuration shown in FIG. 4 to that of FIG. 6. In the latter partial cylindrical configuration leaf 26 is presented as the inner surface of the cylinder and face 23a of leaf 25 is brought into overlapping relationship with the rear surface of triangular zone 24 (FIG. 4) indicated by the reference numeral 24a in FIG. 6. Surface 23a and 24a of zones 23 and 24 respectively are thereby brought into coincident congruent relationship one to the other to complete the cylinder (FIG. 1).

If desired a small amount of adhesive is applied to face 13 along the edges HC and GA (FIG. 4) of the overlapping zones 23 and 24 to maintain the shape of the cylinder. When support member 11 is rolled into a cylinder the terminals 18 at edge 14 of leaf 25 register with the terminals 19 at edge 15 of leaf 26 (FIG. 7). In this position terminals 18 and 19 are disposed around the periphery of one end of the armature cylinder (FIGS. 1 and 6).

In order to complete the armature circuit end tabs 20 are folded from the position shown in FIG. 6 over confronting edges 14–15 whereby each tab 20 communicates with a terminal 18 of an adjacent conductor on leaf 25 (FIG. 7). The end of armature 10 having bent over tabs 20 (FIG. 1) is then dipped into a known copper wetting solution preparatory to soldering. The tab and terminal connections are then dipped in molten solder to simultaneously secure all connections therebetween. A shaft 27 is press-fitted or fixed into an insulated circular disc 28 (FIG. 1) which is adapted to be inserted into a base of armature 10 whereby a rotation of said armature will effect rotation of said shaft.

It will be apparent to those skilled in the art that the above described armature is readily adaptable to known stator assemblies which include a housing constructed of magnetically permeable material, having a cylindrical magnet core affixed thereto and which core is adapted to be disposed within the hollow portion of the armature through the open end thereof. Provision may be made under this arrangement for direct contact between commutator brushes and the printed conductors of the armature. It will also be apparent to those familiar in the art that this invention may be practiced with support members having various other geometrical shapes and winding patterns including lap windings and wave windings, wherein any number of pole pairs can be produced.

Further, if desired, the leaf portions 25 and 26 of support member 11 can be folded in a reverse direction from that shown in FIG. 4. In the latter instant a thin insulating tape is first applied over conductors 17 on face 12 to prevent any contact between the conductors on the confronting faces of leaf portions 25 and 26.

It is apparent from the foregoing that the advantages of the novel armature 10 include among other advantages the provision of conductors on the inner and outer surfaces of a cylindrical armature by printing said conductors on only one face of a support member and folding said member prior to forming the armature cylinder. A further advantage is that only one connection is made between a conductor on the outer surface of the armature cylinder and a conductor on the inner surface thereof.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:
1. A hollow cylindrical armature comprising,
a. at least a pair of insulated sheets with the surface of one sheet of said pair constituting the outer surface of the armature and the other sheet of said pair constituting the inner surface of said cylindrical armature,
b. said insulating sheets having a curved, unbroken unitary cross section in longitudinal cross section at the peripheral edge of one end of said cylindrical armature and the insulated sheets at the peripheral edge of the other end of said armature having discrete ends,
c. a plurality of spaced electrical conductors each having two legs provided on said insulated sheets, with one leg extending along the outer surface of said armature and the other leg extending along the inner surface of the armature,
d. each of said electrical conductors having discrete ends disposed adjacent the peripheral edge of said other end of the armature and having the legs joined in a continuous U-shaped configuration extending over and around the peripheral edge of said one end of the armature,
e. means on one of said insulated sheets for aligning the respective legs of the individual conductors, and
f. said aligning means including means for connecting said aligned legs of the respective conductors.

2. The armature of claim 1 wherein the discrete ends of said insulated sheets at the said other end of the armature are flush with each other.

3. The armature of claim 2 wherein the end of one leg of the conductor extends over the flush discrete ends of the sheets and engages the end of the other leg of the conductor.

4. The armature of claim 3 wherein the engaged ends of said one legs are all disposed on said one sheet and are of reduced dimensions to form tab extensions.